(12) United States Patent
Steigerwalt

(10) Patent No.: US 7,533,466 B2
(45) Date of Patent: May 19, 2009

(54) FOLDING TOOL WITH LOCK

(75) Inventor: Kenneth Steigerwalt, Orangeville, PA (US)

(73) Assignee: Mentor Group, L.L.C., Oregon City, OR (US)

( * ) Notice: Subject to any disclaimer, the term of this patent is extended or adjusted under 35 U.S.C. 154(b) by 686 days.

(21) Appl. No.: 11/238,856

(22) Filed: Sep. 29, 2005

(65) Prior Publication Data
US 2007/0068001 A1 Mar. 29, 2007

(51) Int. Cl.
B27B 21/00 (2006.01)
B26B 1/10 (2006.01)

(52) U.S. Cl. .................... 30/161; 30/153; 81/427.5

(58) Field of Classification Search .............. 30/143, 30/151, 153, 155–164, 286, 514, 517, 519; 7/118, 128; 81/427.5
See application file for complete search history.

(56) References Cited

U.S. PATENT DOCUMENTS

| 304,451 | A | 9/1884 | Rauh |
| 337,858 | A | 3/1886 | Neuhaus |
| 357,353 | A | 2/1887 | Wiesner |
| 390,633 | A | 10/1888 | Weck et al. |
| 404,870 | A | 6/1889 | Schenck |
| 488,340 | A | 12/1892 | Skoglund |
| 530,913 | A | 12/1894 | Cook, Jr. |
| 728,416 | A | 5/1903 | Rowland |
| 730,025 | A | 6/1903 | Kaufmann |
| 736,524 | A | 8/1903 | Kaufmann |
| 778,684 | A | 12/1904 | Lewis |
| 825,093 | A | 7/1906 | Watson |
| 861,789 | A | 7/1907 | Zimmer |
| 866,431 | A | 9/1907 | Case |
| 924,070 | A * | 6/1909 | Holman ................ 30/161 |
| 947,980 | A * | 2/1910 | Romano ................ 30/153 |
| 950,102 | A | 2/1910 | Hall |
| 1,030,058 | A | 6/1912 | Doles |
| 1,476,123 | A | 12/1923 | Watson |
| 2,559,689 | A * | 7/1951 | Truesdell ................ 30/151 |
| 2,906,021 | A * | 9/1959 | Cromoga ................ 30/293 |
| 4,523,379 | A * | 6/1985 | Osterhout et al. ......... 30/151 |
| 5,781,998 | A * | 7/1998 | Stamper ................ 30/139 |
| 6,694,620 | B2 * | 2/2004 | Kanzawa ................ 30/161 |

* cited by examiner

Primary Examiner—Boyer D. Ashley
Assistant Examiner—Edward Landrum
(74) Attorney, Agent, or Firm—Hancock Hughey LLP

(57) ABSTRACT

A hand tool such as a fillet knife or limb saw with a blade that is longer than the handle has a blade guard arm that shields the blade when in the closed position. The blade guard arm is longitudinally slidable in the tool handle and engages the blade tang when the blade is in the open position, thereby locking the blade open.

16 Claims, 3 Drawing Sheets

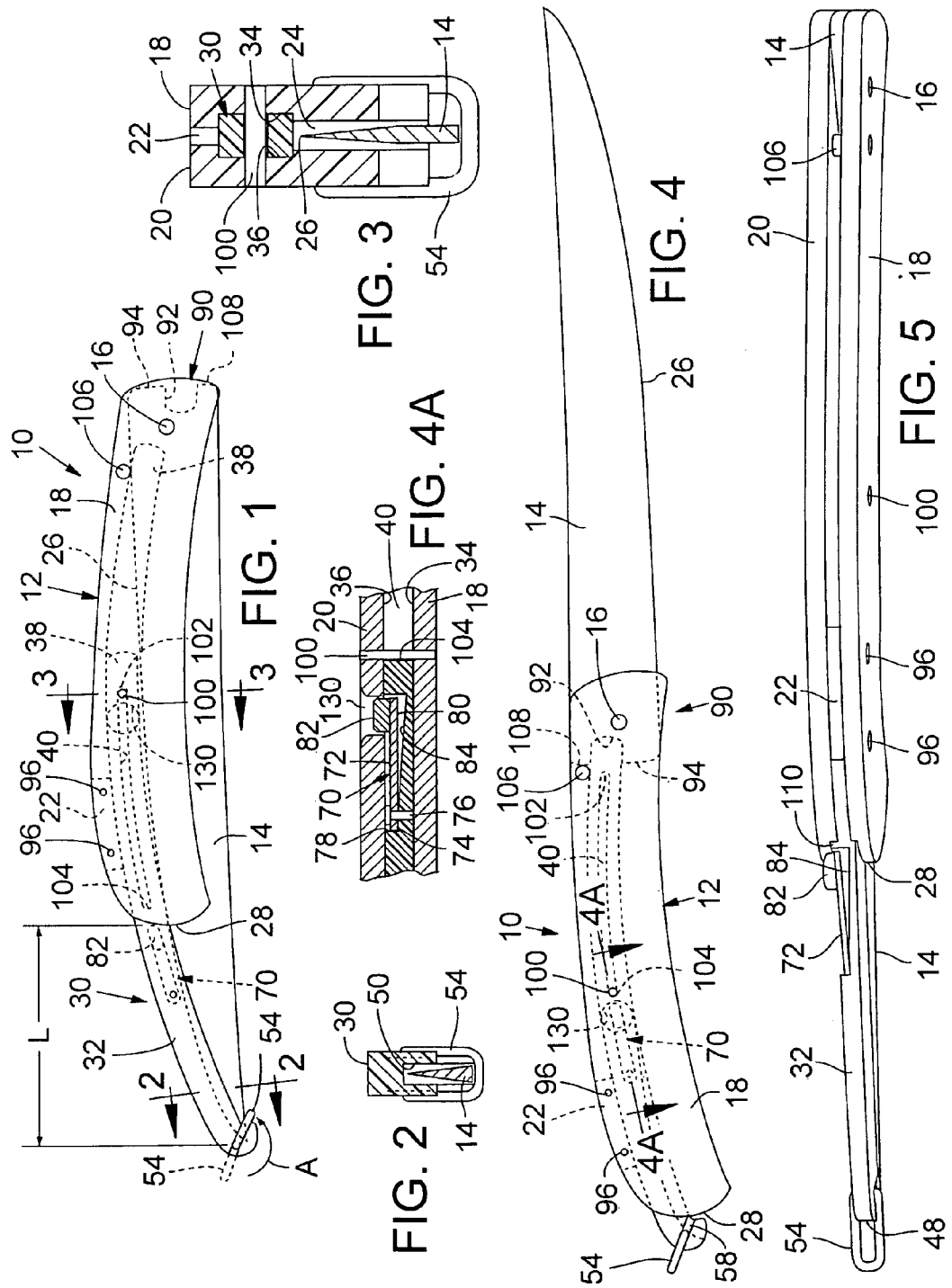

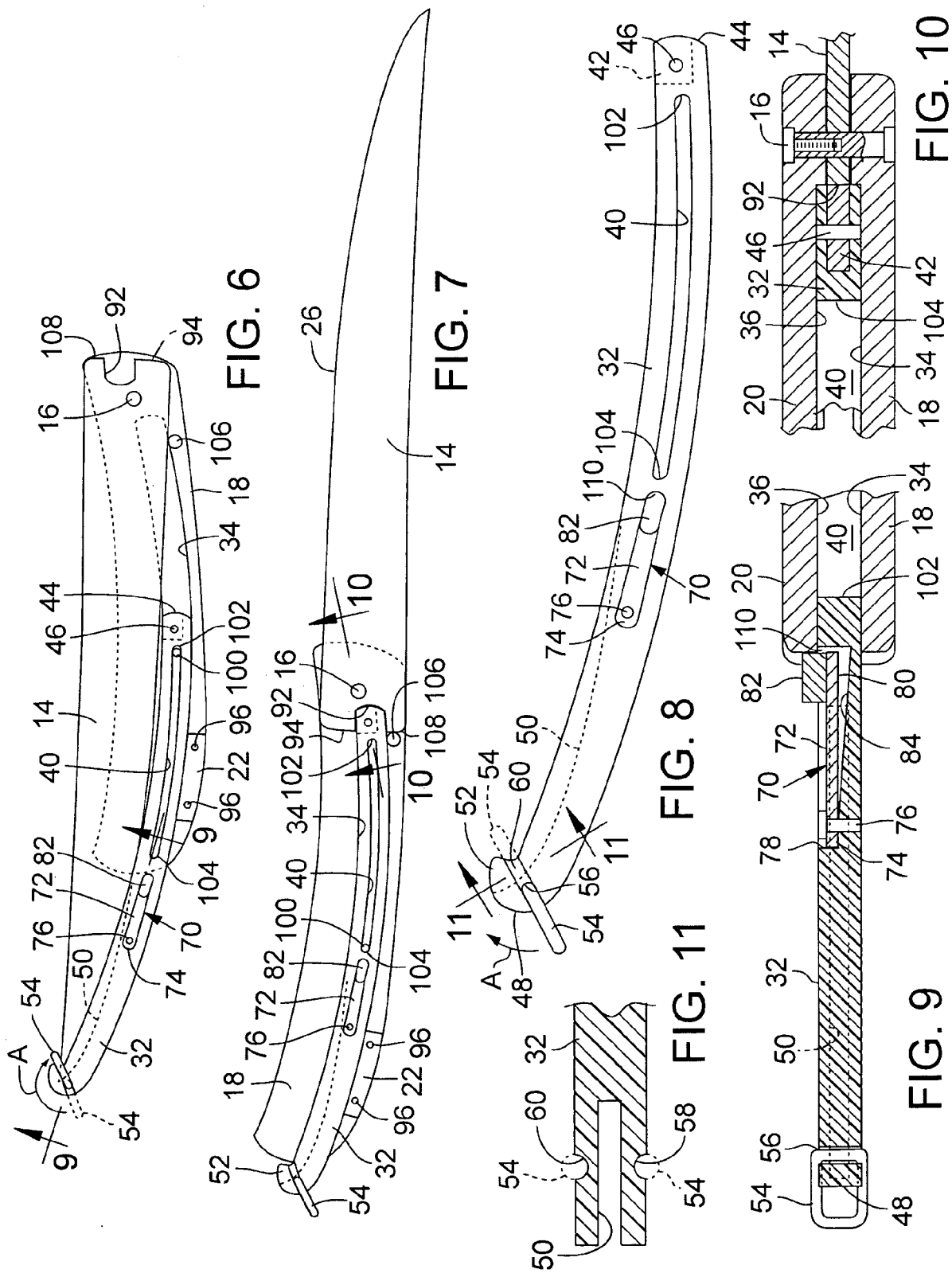

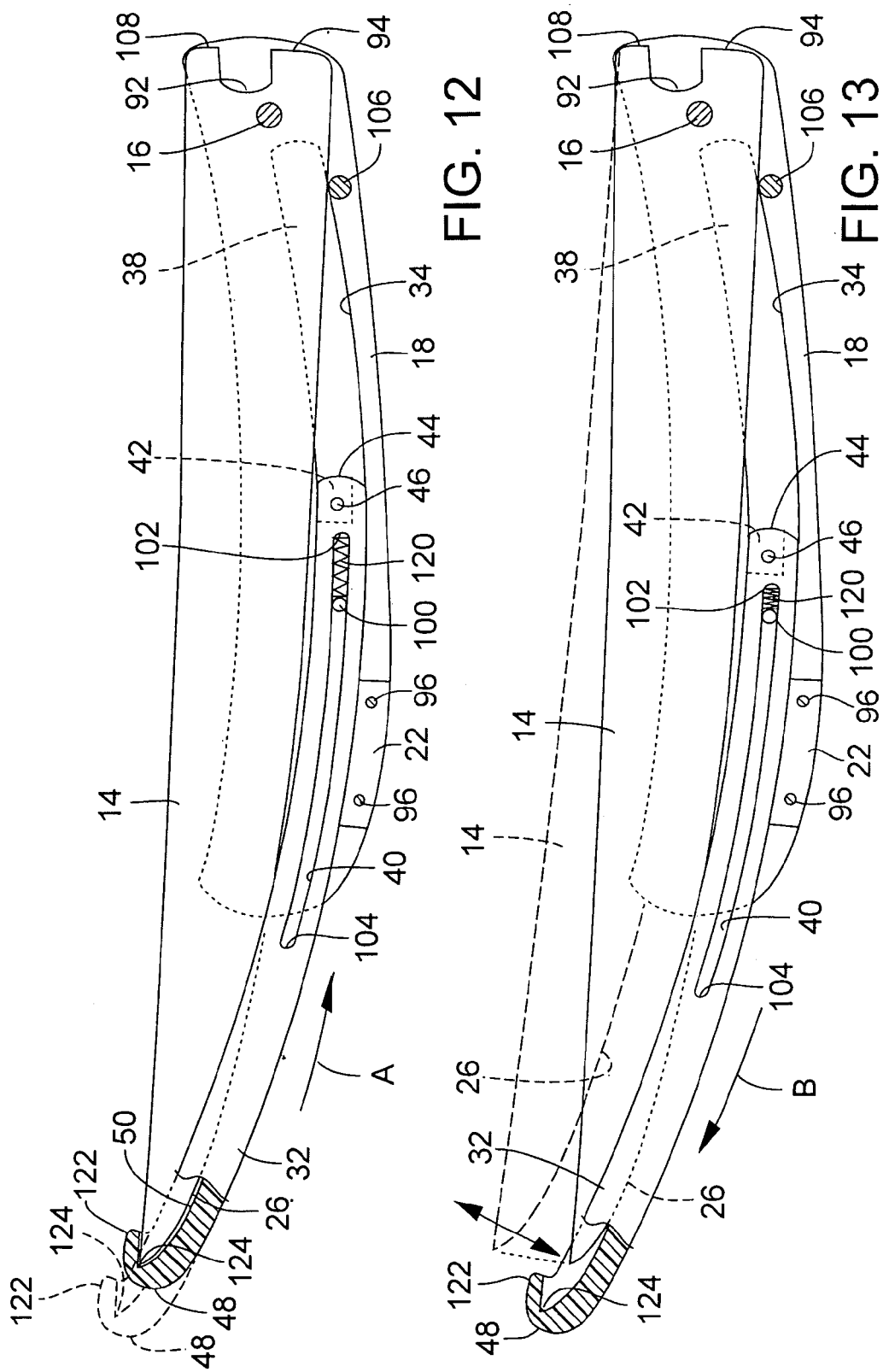

FOLDING TOOL WITH LOCK

FIELD OF THE INVENTION

This invention relates to folding tools such as fillet knives, and more particularly to such a folding tool that has a blade that is longer than the handle, a sheath and a locking mechanism.

BACKGROUND

There are many types of knives and other hand tools such as limb saws that have a blade that is longer than the handle. This is particularly true of fillet knives. While there are many different sizes and styles of fillet knives, if there is any one characteristic that is common to almost all fillet knives, it is that the blade is relatively flexible compared to many other types of knives. By making the blade so that it is capable of flexing, the knife is especially useful to cut—that is, to "fillet"—fish and other types of meat. As noted, another characteristic of many fillet knives is that the blade is longer than the handle. The longer blade allows the knife to be useful in cutting larger fillets.

It will be appreciated that where a tool such as a fillet knife has a blade that is longer than the handle, if the knife is made into a folding knife then at least some length of the blade necessarily extends beyond the butt end of the handle. This presents several problems, since the portion of the blade that extends beyond the handle should be protected with some type of a blade guard to prevent the user from exposure to the blade when not in use. As a result, there are very few folding knives that use blades that are longer than the handle.

An old knife known as the Marbles Safety Knife was an example of a folding knife that was manufactured in the early 1900s that a blade that was longer than the handle. In the Marbles knife, an arm pivotally attached to the handle near the butt end could be swung out to cover the exposed part of the blade when the knife was closed. When the blade was opened, the arm could be swung the other direction and the arm served as a lock for the blade.

The present invention relates to a folding tool that has a blade that is longer than the handle. The tool incorporates a blade guard that shields the blade when the knife is folded. The blade guard is longitudinally slidable in a slot in the body of the tool. The tool also incorporates a lock mechanism for securely locking the blade in the open position, and for releasing the lock to allow the blade to be folded back into the closed position.

BRIEF DESCRIPTION OF THE DRAWINGS

The invention will be better understood and its numerous objects and advantages will be apparent by reference to the following detailed description of the invention when taken in conjunction with the following drawings.

FIG. 1 is a side elevation view of a folding fillet knife according to the present invention, illustrating the blade in the folded position and the blade guard in the extended position, and showing some structures in phantom lines.

FIG. 2 is a cross sectional view taken along the line 2-2 in FIG. 1.

FIG. 3 is a cross sectional view taken along the line 3-3 in FIG. 1.

FIG. 4 is a side elevation view of the fillet knife shown in FIG. 1, illustrating the blade in the open position and the blade guard slid longitudinally into the handle to lock the blade in the open position.

FIG. 4A is a cross sectional view taken along the line 4A-4A of FIG. 4, showing an optional locking mechanism.

FIG. 5 is a top perspective view of the handle of the fillet knife shown in FIG. 1.

FIG. 6 is a side elevation view of the fillet knife according to the present invention with the near-side of the handle removed to expose the structural components within the interior of the handle. In FIG. 6 the blade is in the closed or stowed position and the blade guard is in the extended position.

FIG. 7 is a side elevation view of the fillet knife shown in FIG. 6 with the near-side of the handle removed, showing the blade in the extended or open position with the blade guard in the locking position.

FIG. 8 is a side elevation view of the blade guard shown in isolation.

FIG. 9 is a cross sectional view taken along the line 9-9 of FIG. 6.

FIG. 10 is a cross sectional view taken along the line 10-10 of FIG. 7.

FIG. 11 is a cross sectional view taken along the line 11-11 of FIG. 8.

FIG. 12 is a side elevation, partially cut-away view of one illustrated alternative embodiment of a fillet knife according to the present invention with the near-side of the handle removed to expose the structural components within the interior of the handle. In FIG. 12 the blade is in the closed position and the blade guard is in the extended position.

FIG. 13 is a side elevation view similar to the view of FIG. 12 and illustrating the movement of the blade guard as it releases the blade.

DETAILED DESCRIPTION OF THE PREFERRED EMBODIMENTS

A preferred embodiment of a folding tool 10, in this case a fillet knife 10 in accordance with the illustrated invention is shown in the figures. Although the invention is described with respect to its embodiment in a particular type of folding tool—a fillet knife—it will be appreciated that references to this type of a knife, and indeed this particular type of hand tool, are for illustrative purposes to describe the invention. Those of ordinary skill in the art will appreciate that the invention claimed herein is not limited to fillet knives, but instead extends to any hand tool having the features claimed herein. One specific example is a folding limb or pruning saw, which may be manufactured with analogous structures to those described herein. It will be understood therefore that the folding fillet knife described herein enables the invention described and claimed, but the scope of the invention is limited only by the claims.

With particular reference now to FIGS. 1, 4 and 5, knife 10 includes a handle 12 with a blade 14 pivotally attached to one end of the handle at a pivot axis defined by blade pivot shaft 16. Handle 12 comprises two primary structural components, a first handle half 18, and a second handle half 20. The handle halves 18 and 20 are assembled with blade 14 pivotally attached to both handle halves with pivot shaft 16 and a spacer 22 that lies between the halves along an upper section of the handle 12 when the knife is assembled (see, e.g., FIG. 5). Spacer 22 and blade 14 hold the handle halves 18 and 20 in a spaced apart orientation to define a blade slot 24 between the halves. When the blade is in the closed position (e.g., FIG. 1), the working portion or sharpened edge 26 of blade 14 is safely stowed in slot 24. Blade 14 is pivotally movable about pivot shaft 16 between the fully closed position (FIG. 1) and the fully open position (FIG. 3).

It will be apparent from the drawings that the length of blade 14 is greater than the length of handle 12, and as a result, when the blade is in the folded position shown in FIG. 1, a substantial length of the blade extends beyond the rearward most point or butt end 28 of handle 12 (relative directional words used herein are made from and are relational to the following reference points in FIG. 1: "forward" or "front" is the longitudinal end of the knife toward the tip of blade 14 when the knife is in the open position; "rearward" or "back" is opposite forward; "upper" or "top" is the spine edge of the handle opposite slot 24; and "lower" or "bottom" is opposite upper). The length of the blade that extends beyond butt end 28 is shown in FIG. 1 with dimension L. Thus, the length of the handle measured from the pivot shaft 16 to the rearward end of the handle is less that the length of the blade, measured from the tip of the blade to the pivot axis.

In order to shield that portion of blade 14 that is exposed when the blade is closed (i.e., length L), a blade guard mechanism 30 is used. Blade guard mechanism 30 comprises an elongate arm 32 that is longitudinally slidable in paired slots 34 and 36 in handle halves 18 and 20, respectively. With reference to FIG. 3, it may be seen that slot 34 in handle half 18 is oriented directly opposite slot 36 in handle half 20 so that together the paired slots align to define an elongate slot 38 for receiving arm 32 in the assembled knife. Arm 32 is sized so that it fits snugly, but slidably in the slot 38. Arm 32 is shown in isolation in FIG. 8. With reference to that figure, and to FIGS. 9 through 11, the arm 32 is slightly arcuate so that the exposed portion of the blade, which is similarly slightly arcuate, nests in the arm. It will be appreciated that slot 38 also is arcuate in the same dimensions as arm 32 so that the arm slides easily in the slot. A through-slot 40 is formed through arm 32 and an optional, wear-resistant hardened steel insert 42 is held in forward end 44 of arm 32 with a retaining pin 46.

The inner side of arm 32—that is, the side of the arm that faces blade 14 when the blade is in the closed position has a longitudinally extending central groove 50 that is designed to receive and shield the working portion 26 of blade 14 to prevent damage to the blade, and to prevent the portion of the blade that extends rearward of the handle when the blade is closed from being exposed. The arm 32 thus serves as a sheath that protects that portion of blade 14 that is exposed when the blade is in the closed position of FIG. 1. The rearward end 48 of arm 32 includes a broadened portion 52 that is configured to surround the outermost tip of blade 14. A resilient clip 54 loops through a through-hole 56 formed in arm 32 (see, e.g., FIG. 9). It will be appreciated that clip 54 is pivotal about the rearward end 48 in the manner indicated with arrow A in FIG. 1.

As noted, clip 54 is fabricated from a resilient material. Grooves 58, 60 are formed in opposite sides of arm 32 and the arms of clip 54 reside in grooves 58 and 60 when the clip is in the position shown in FIG. 1. Since clip 54 is resilient, pivoting the clip from the position shown in FIG. 1, where the arms are received and nested in grooves 58, 60, to the position shown in FIG. 4, requires some force to overcome the bias supplied by the clip. The two positions of clip 54 are illustrated in FIG. 8, with the direction of pivotal movement shown with arrow A. The clip position shown in solid lines is referred to as the release position; and the clip position shown in phantom lines is referred to as the secure position.

Arm 32 of blade guard mechanism 30 further includes an arm locking mechanism identified generally with reference number 70. With specific reference to FIGS. 8 and 9, mechanism 70 comprises a spring arm 72 having its rearward end 74 fixed with a pin 76 in a cavity 78 formed in arm 32. The forward end 80 of spring arm 72 defines an activating button 82. Cavity 78 is configured to receive the spring arm 72 and has a bottom surface 84 that slopes downwardly in the direction from pin 76 toward the forward end 80 of the spring arm. As best seen in FIG. 9, the sloping bottom surface allows the spring arm to be moved inwardly against the spring pressure supplied by the spring arm from the normally resting position shown in FIG. 9, to a release position, in which the arm may slid longitudinally into slot 38. As will be detailed below, the depth of cavity 78 at the forward end is sufficiently deep that when the activating button 78 is depressed—that is, when the button is pressed, the button clears handle half 20 so that the arm 32 may be slid in slot 38.

Returning now to FIG. 1, the tang 90 of blade 14 includes a notch 92 formed in the rear portion of the tang—that is, that portion of the tang that is at the rearward end 94 of the blade.

Knife 10 is assembled by connecting handle halves 18 and 20 with sufficient attachment members such as screws to secure the two handle halves together. Blade 14 is pivotally attached between the handle halves with pivot shaft 16, and spacer 22 is similarly secured in place between the handle halves with pins, which extend through holes in the spacer and have their opposite ends fixed in the respective handle halves. Arm 32 is held in slot 38 and a guide pin 100 extends through slot 40. Guide pin 100 has its opposite ends fixed in the respective handle halves.

As described above, arm 32 is longitudinally slidable in slot 38. The range of sliding motion of the arm is limited by guide pin 100. Specifically, slot 40 in arm 32 has a forward end 102 and a rearward end 104. The travel of arm 32 in the forward direction as it slides in slot 38 is stopped when guide pin 100 abuts rearward end 104 of the slot 40 in the arm 32. This configuration is shown in FIG. 4. Similarly, the range of travel of arm 32 in the rearward direction is stopped when guide pin 100 abuts the forward end 102 of slot 40. This position is shown in FIG. 1. The length of slot 40 thus defines the linear distance that arm 32 may be moved in the assembled knife 10. Arm 32 is slidable from a first position in which the arm is extended away from handle 12 (FIG. 1), and a second position in which most of the arm is contained within the handle (FIG. 4).

Operation and function of the sliding blade guard mechanism 30 will now be described. Referring to FIG. 1, with blade 14 in the closed position, arm 32 is extended outwardly to the maximum distance (i.e., the first position) and guide pin 100 is abutting end 102 of slot 40. Blade 14 may be rotated from the open position to the closed position. With blade 14 closed, the working portion 26 of blade 14 is safely stowed in groove 50. Clip 54 may be pivoted or flipped from the release position shown in phantom lines in FIG. 1, to the secure position, which is shown in solid lines. As shown in FIG. 2, in the secure position, clip 54 prevents blade 14 from being rotated out of the closed position. The clip thus functions as a safety mechanism. The clip stays in this secure position by virtue of the resilient clip arms being received in grooves 58 and 60.

In addition, with arm 32 fully extended, the arm locking mechanism 70 functions to lock arm 32 in the extended position and prevent the arm from sliding in the forward direction until the locking mechanism 70 is released. Referring now to FIGS. 5 and 9, it may be seen that with arm 32 in the extended position, spring arm 72 is positioned such that activation button 82 extends over the edge of handle half 20. With the activation button 82 in this position, arm 32 may not be slid in the forward direction because the activation button physically abuts handle half 20, thereby blocking the arm from being slid forward.

The dual safety mechanisms provided by clip 54 and activation button 82 prevent blade 14 from being moved from the closed position until desired.

The blade is opened by first flipping clip 54 from the secure position to the release position shown in FIGS. 4, 5, 7 and 8. With the clip in this position, blade 14 may be rotated about pivot shaft 16 to the fully open position shown in FIGS. 4 and 7. Rotation of blade 14 is stopped when a shoulder portion 108 on tang 90 contacts a blade stop pin 106 that extends between handle halves 18 and 20. Activation button 82 may then be depressed by pressing the button inwardly, against the spring force applied by spring arm 72. As shown in FIG. 9, because the bottom surface 84 of cavity 78 is sloped, button 82 may be depressed inwardly—that is, toward bottom surface 84, a sufficient distance that button 82 clears the abutting edge 110 of handle half 20. Once button 82 clears edge 110, arm 32 may be slid forwardly. As arm 32 is slid forwardly in slot 38 and the button 82 enters the slot, the button is urged against the interior surface of slot 36 under the force applied to the button by spring arm 72. This provides resistive tension on the arm 32. As a result, some force is necessary to slide arm 32 in the forward direction.

With the blade in the fully open position with shoulder 108 abutting stop pin 106, arm 32 is slid forward until the forward end 44 of arm 32 engages notch 92 in tang 90. When the forward end of arm 32 engages notch 92, the upper portion of arm 32 rests against stop pin 106. As best seen with reference to FIG. 7, notch 92 in tang 90 is cooperatively shaped so that it receives forward end 44 of arm 32. The forward end 44 thus engages notch 92 and thereby securely locks blade 14 in the fully open position, preventing the blade from rotating out of the open position. Because arm 32 is also resting against stop pin 106, the locking engagement between the blade 14 and arm 32 is very stable. It will be readily appreciated that the notch 92 defines a locking surface on tang 90 that abuts a cooperative locking surface on arm 32, and that the particular configuration of notch 92 and forward end 44 illustrated herein may be varied widely while still maintaining a locking mechanism comprising a sliding member that engages a locking surface the blade to prevent its rotation out of the open position.

Arm 32 is maintained in this forward, locking position by the frictional fit of the arm in slot 38, aided by the tension applied to arm 32 by button 82, which is compressed in the slot and bears outwardly against the handle half 20.

Blade 14 is moved from the open position to the closed position by first sliding arm 32 in the rearward direction until forward end 44 disengages from notch 92. Once these structures disengage, the blade may be rotated toward the closed position as described above. Arm 32 is slid in the rearward direction until the limit of travel is reached at the first position, at which point the blade 14 may be secured with clip 54.

A first alternative embodiment of a folding fillet knife is shown in FIGS. 12 and 13. In this embodiment, the blade guard mechanism has been modified such that a hook 122 has been formed on the rearward end 48 of arm 32. The interior portion of hook 122 defines a seat 124 configured for receiving the tip of blade 14, as illustrated. A spring 120 is positioned in slot 40 of arm 32, between guide pin 100 and forward end 102. Spring 120 is loose in slot 40—neither end of the spring is connected to any structure. With reference to FIG. 12, which shows blade 14 in the closed position, spring 120 is sized so that when the arm 32 is in the extended position, the spring bears on forward end 102 of slot 40 and thereby exerts biasing pressure on the spring arm, driving the spring arm in the forward direction shown with arrow A. This pressure keeps the tip of blade 14 held firmly in seat 124, and thereby prevents the blade from being rotated out of the closed position. Although the knife 10 shown in FIGS. 12 and 13 does not include the arm locking mechanism 70 described above, the identical mechanism may of course be used with this embodiment.

The phantom lines in FIG. 12 illustrate the range of motion of arm 32 in the rearward direction. FIG. 13 illustrates how arm 32 is moved in the rearward direction of arrow B in order to release blade 14. As arm 32 is moved in the direction of arrow B, spring 120 is further compressed. Accordingly, force must be applied to the arm to overcome the normal biasing force applied to arm 32 by spring 120. With the arm 32 moved a sufficient distance rearward, as shown in FIG. 13, the blade 14 may be moved away from the closed position toward the open position, and vice versa, as shown by the directional arrows.

It will also be appreciated that various design modifications may be made without departing from the nature and scope of the invention. For example, although the handle 12 and blade 14 illustrated herein are slightly curved, as is typical of many fillet knives, the blade and handle could be any variety of shapes. If the blade and handle were relatively straight, the blade guard arm mechanism would be similarly relatively straight.

In addition, as noted above, the configuration of the locking surfaces on the forward end 44 of arm 32, and the cooperative surface on tang 90, may be varied considerably so long as there is an abutting relationship between the two that locks the blade 14 in the open position. In this regard, and returning to FIG. 4A, an optional locking feature is disclosed for locking arm 32 in the forward position. Specifically, as shown in FIG. 4A, an opening 130 is formed in handle half 20 in a position such that when arm 32 is moved forward to the locking position—that is, where guide pin 100 abuts rearward end 104 of slot 40 as shown—button 82 pops into opening 130, thereby locking arm 32 in the forward position. To release the locking feature, button 82 is depressed, pushed inwardly until the button clears the inner edge of the handle half 20 so that the arm 32 may be slid rearwardly. Other equivalent structures may be used to lock arm 32 in the forward position, such as a spring-loaded detent button that extends through the handle and engages the arm 32 when depressed. Other equivalent structures will be apparent to those of ordinary skill in the art.

Finally, it will be apparent that the principals of the invention are not limited to fillet knives, but also extend to hand tools such as folding pruning saws. The invention described herein allows such a saw to be fitted with a blade that is longer than otherwise would be usable.

While the present invention has been described in terms of a preferred embodiment, it will be appreciated by one of ordinary skill that the spirit and scope of the invention is not limited to those embodiments, but extend to the various modifications and equivalents as defined in the appended claims.

I claim:

1. A folding tool, comprising:
a handle having first and second opposed side walls held in a spaced-apart arrangement to define a blade-receiving slot therebetween, said handle having a forward end and a rearward end and a pivot axis near the forward end, said handle defining a handle length between the pivot axis and the rearward end;
a blade having a tip, a working portion and a tang portion pivotally attached to the handle at the pivot axis, said blade movable between a closed position and an open position and the length of said blade from the pivot axis to the tip being greater than the handle length so that when the blade is in the closed position a portion of the blade extends beyond the rearward end of the handle;

an elongate blade guard longitudinally slidable into and out of the rearward end of the handle in a blade-guard slot defined by opposed grooves formed in the first and second sidewalls respectively and such that said blade guard spans the blade-receiving slot, said blade guard configured for receiving the working portion of the blade that extends beyond the rearward end of the handle when the blade is in the closed position, and said blade guard having a forward end and a rearward end, said blade guard slidabie in the blade-guard slot between a forward position and a rearward position, whereby when the blade is in the closed position and said blade guard is in the rearward position, said tip of said blade is retained in said blade guard, and wherein with said blade in the open position said blade guard may be slid to the forward position and the forward end of said blade guard engages a notch formed in the tang of said blade to thereby lock said blade in the open position.

2. The folding tool according to claim 1 including blade retaining means on said rearward end of said blade guard for releasable locking said blade in said closed position.

3. The folding tool according to claim 2 wherein said blade retaining means further comprises a clip movable between a secure position in which said clip locks said blade and a release position in which said blade may be moved from said closed position.

4. The folding tool according to claim 1 including locking means on said blade guard for releasably locking said blade guard in said rearward position.

5. The folding tool according to claim 4 wherein said locking means further comprises a spring-biased button positioned on said blade guard such that said button in a locked position engages said handle to prevent said blade guard from moving to the forward position.

6. The folding tool according to claim 1 wherein the forward end of said blade guard is cooperatively shaped with said notch so that the forward end of said blade guard abuts with said notch.

7. The folding tool according to claim 1 wherein said blade guard includes a longitudinal groove for receiving and shielding the working portion of the blade when the blade is in the closed position.

8. The folding tool according to claim 1 wherein said tool is a fillet knife.

9. The folding tool according to claim 1 wherein said tool is a pruning saw.

10. In a folding hand tool having an elongate handle with a forward end and a rearward end and a pivot axis, said handle defining a handle length between the pivot axis and the rearward end, the handle formed by two opposed side walls forming an implement receiving channel therebetween, and an implement with a tip and a working portion, the implement pivotally attached to the handle with a pivot shaft at the pivot axis so that said implement is foldable between open and closed positions, the implement having a length from the pivot axis to the tip that is greater than the handle length, so that when the implement is in the closed position a portion of the implement extends beyond the rearward end of the handle, the improvement comprising:

a sheath defined by an elongate arm having a forward end and a rearward end, said sheath slidable in a sheath-receiving slot formed in said handle and defined by opposed, paired grooves in the respective opposed side walls of said handle, said sheath slidable in said handle between a first position in which said sheath guards the portion of the implement that extends beyond the rearward end of the handle, and a second position in which said sheath is substantially contained in said handle and the forward end of said elongate arm engages a notch in a locking surface on said implement to lock said implement in said open position.

11. The folding tool according to claim 10 wherein said forward end of said elongate arm is cooperatively shaped with said notch to securely lock said implement in said open position.

12. The folding tool according to claim 11 wherein said forward end of said arm includes a wear-resistant insert.

13. The folding tool according to claim 10 including arm locking means for retaining said arm in said second position.

14. A folding tool, comprising:

a handle having first and second opposed side walls and a blade-receiving slot therebetween, said handle defining a handle length between a forward end and a rearward end and said handle having opposed, facing grooves formed in the respective opposed side walls to define a blade guard slot for receiving a blade guard;

a blade having a tip, a working portion and a tang portion with a notch formed therein, said blade pivotally attached to the handle at a pivot shaft, said blade movable between a closed position and an open position and the length of said blade from the pivot shaft to the tip being greater than the handle length so that when the blade is in the closed position a portion of the blade extends beyond the rearward end of the handle;

a blade guard slidable within said blade guard slot between a first position for shielding the working portion of the blade that extends beyond the rearward end of the handle when the blade is in the closed position and a second position for locking said blade in said open position in which a forward end of said blade guard engages said notch formed in the blade.

15. The folding tool according to claim 14 wherein the blade guard further comprises retaining means for securing said blade in said closed position.

16. The folding tool according to claim 14 including locking means on said blade guard for releasebly locking said arm in said extended position.

* * * * *